United States Patent [19]

George, II et al.

[11] Patent Number: 5,236,010
[45] Date of Patent: Aug. 17, 1993

[54] WEIGHT CONTROLLED VALVE

[75] Inventors: Paul E. George, II, Dublin, Ohio; Richard E. Wendorf; Bruce E. Taber, both of Bothell, Wash.

[73] Assignee: Gas Research Institute, Chicago, Ill.

[21] Appl. No.: 886,373

[22] Filed: May 20, 1992

[51] Int. Cl.$^5$ ............................................. F16K 17/12
[52] U.S. Cl. ..................................... 137/534; 137/554
[58] Field of Search ........... 137/532, 534, 554, 533.17, 137/538

[56] References Cited

U.S. PATENT DOCUMENTS

| | | |
|---|---|---|
| 860,820 | 7/1907 | Norton ................................. 137/538 |
| 1,474,192 | 11/1923 | Gessler ........................... 137/534 X |
| 1,848,531 | 3/1932 | Lamb ............................... 137/538 X |
| 2,218,700 | 10/1940 | Cornell ............................ 137/534 X |
| 2,486,899 | 11/1949 | Williams .............................. 137/534 |
| 2,739,607 | 3/1956 | Murray . |
| 2,796,229 | 6/1957 | Newhall . |
| 2,833,374 | 5/1958 | Glasser . |
| 3,525,360 | 8/1970 | Bacchi . |
| 4,308,887 | 1/1982 | van Bogaert . |

Primary Examiner—Robert G. Nilson
Attorney, Agent, or Firm—Philip M. Dunson

[57] ABSTRACT

A pressure regulating valve 10 is provided in a housing 11 filled with oil 23 and having an inlet port 12 and an outlet port 13. A straight elongate vertical tube 14 having a lengthwise slot 19 near its lower end 15 is affixed to the housing and communicates with the inlet port. Closely fitting down into the tube is a piston 16, slidable between a lower position 29 with its lower end 17 below the slot and a substantially higher upper position. A coaxial annular weight 22, surrounding upper portions of the piston and the tube, is affixed to the piston to exert a downward force thereon by virtue of the gravitational attraction of the weight to the earth. When oil is supplied under pressure to the inlet port, the oil presses upward, and the weight presses downward, against the piston; and when the lower end of the piston is at a level between the ends of the slot, the oil flows in from the inlet port, through the open portion of the slot, into the other space in the housing, and out through the outlet port, at a substantially constant predetermined pressure.

17 Claims, 2 Drawing Sheets

WEIGHT CONTROLLED VALVE

FIELD

This invention relates to a valve for maintaining a substantially constant predetermined pressure in a fluid, such as oil, that flows through the valve. It has to do more particularly with a valve in which a weight presses downward on a piston in a vertical tube having a lengthwise slot, to control the size of the open part of the slot through which fluid can pass below the piston; while the piston is pressed upward by the pressure of the fluid in a system wherein the valve is connected.

The present invention is related to the subject matter disclosed in the following U.S. patent applications and patents:

Ser. No. 07/953,557, filed Sep. 29, 1992, by Paul E. George, II, and John S. Barnhart, for Heat Exchanger; now U.S. Patent Ser. No. 07/886,509, filed May 20, 1992, by J. Douglas Dickson, for Positioning Mechanism; now U.S. Patent Ser. No. 07/886,372, filed May 20, 1992, by Paul E. George, II, J. Douglas Dickson, and John S. Barnhart, for High-Volume Cooking; now U.S. Patent

BACKGROUND

The valve has been used to advantage in a circulating hot oil system to maintain nearly constant oil flow through a pump and/or heat exchanger regardless of the oil demand by the remainder of the system. FIG. 4 is a schematic diagram of such a hot oil system. Oil is routed to the various loads in response to a temperature or other controller. When all load valves are fully open, oil flow through the pump and heat exchanger would be much greater than with all load valves closed, if the weight controlled valve were not present in the system.

This valve provides a means of by-passing oil back to the pump suction, thereby maintaining flow through the heat exchanger. The weight controlled valve maintains a nearly constant pressure difference between the supply and return manifolds so that any load receives the same quantity of oil regardless of the number of other loads in service.

The weight controlled valve differs from existing technology as follows. Currently, either spring loaded relief valves or actively controlled throttling valves are used to bypass oil when not required by the loads. The pressure drop through spring loaded valves increases as flow through the valve increases. The difference in manifold pressure from supply to return is a function of the number of loads in service. Further, the springs used in spring type relief valves are subject to deterioration with temperature and number of operating cycles.

An additional disadvantage to spring type relief valves is that the necessary variation of pressure through the valve with flow can reduce flow through the heat exchanger as loads are turned off, especially if a centrifugal pump is used. This can cause overheating of the oil due to low velocities on the heat exchanger and may increase pump power and wear as well. Actively controlled throttling valves can avoid most of these problems but are prohibitively expensive for many applications.

DISCLOSURE

The weight controlled valve is shown schematically in FIGS. 1, 2, and 3. A piston fits into a tube with one or more slots. A weight is placed on top of the piston. The weight is sized by:

$$W = P * A$$

where P is the desired pressure and A is the cross sectional area of the piston. In operation, the weight is balanced by the pressure in the bottom of the piston. A slight increase in pressure below the piston will force the piston and the weight upward, exposing more slot flow area, which will reduce the pressure drop across the slots and allow a new equilibrium position to be reached.

Oil enters the valve via the bottom. The oil passes up through the central tube and exits the tube through a slot cut in the side of the tube. The portion of the slot exposed is varied by the position of the piston, which is a metallic rod. A weight is placed on the top of the rod. The weight is supported by the pressure on the base of the rod, hence the pressure in the central tube is determined only by the amount of weight applied to the rod. Further, the pressure at the base of the rod is independent of the position of the rod, and consequently, of the amount of slot exposed. There is a secondary effect due to the velocity pressure of fluid flowing up through the tube and impacting the bottom of the rod. For the purpose of this invention, the effect is negligible.

A typical pressure regulating valve 10 according to the present invention is provided in a housing 11 filled with oil 23 and having an inlet port 12 and an outlet port 13. A straight elongate vertical tube 14 having a lengthwise slot 19 near its lower end 15 is affixed to the housing and communicates with the inlet port. Closely fitting down into the tube is a piston 16, slidable between a lower position 29 with its lower end 17 below the slot and a substantially higher upper position. A coaxial annular weight 22, surrounding upper portions of the piston and the tube, is affixed to the piston to exert a downward force thereon by virtue of the gravitational attraction of the weight to the earth. When oil is supplied under pressure to the inlet port, the oil presses upward, and the weight presses downward, against the piston; and when the lower end of the piston is at a level between the ends of the slot, the oil flows in from the inlet port, through the open portion of the slot, into the other space in the housing, and out through the outlet port, at a substantially constant predetermined pressure.

DRAWINGS

CARRYING OUT THE INVENTION

Figure 3:
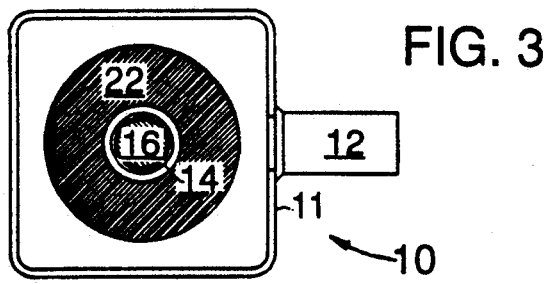
FIG. 3 is a top sectional view of the valve in FIG. 1, taken in the plane 3—3 in FIG. 1.
Figure 1:
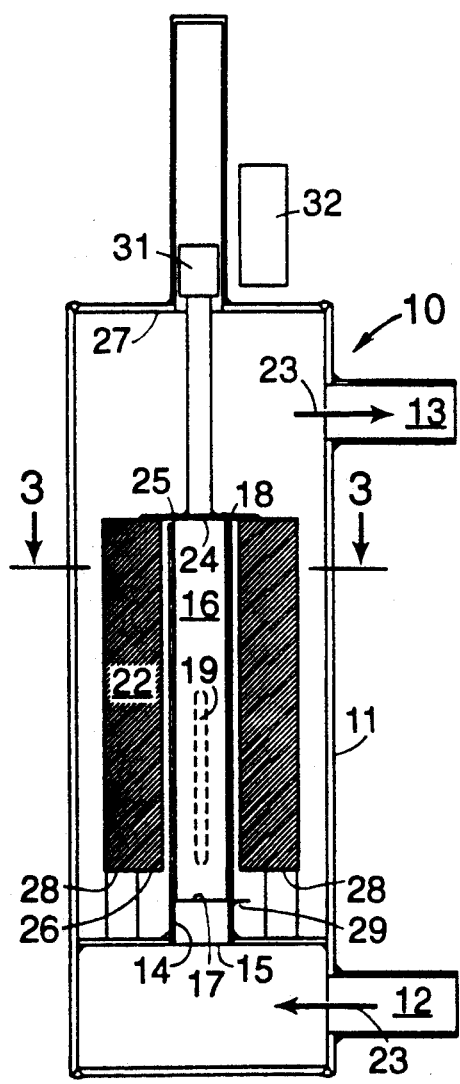
FIG. 1 is a partly schematic front sectional view of a typical weight controlled valve according to the present invention, showing the weight and piston in their lowest position.
Figure 2:
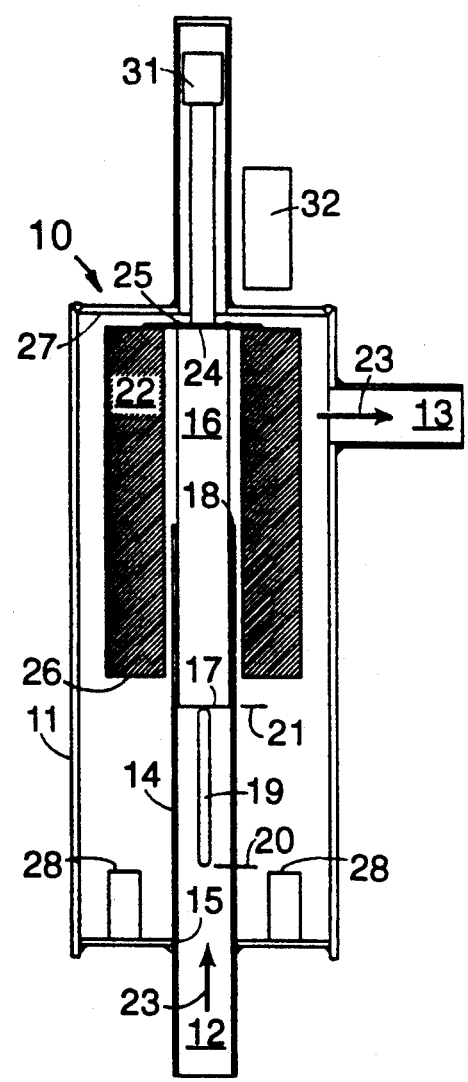
FIG. 2 is a similar view of the same valve (except for an alternative, slightly modified, inlet portion at the bottom), showing the weight and piston in their highest position.

Referring now to FIGS. 1, 2, and 3, a typical pressure regulating valve 10 according to the present invention, adapted for mounting and operation in a predetermined fixed attitude, comprises a housing 11 having an inlet port 12 and an outlet port 13; and a straight elongate tube 14 so affixed to the housing as to be positioned vertically when the valve 10 is mounted in the fixed attitude for operation, and having an opening 15 at its lower end communicating with the inlet port.

A piston 16 having a solid horizontal lower end 17 extends down into the tube 14 from the open upper end 18 of the tube 14, and closely but slidably fits therein. A substantially lengthwise aperture 19 in the tube 14, extends upward from a level 20 near the lower end of the tube 14 to a level substantially below the upper end 18 of the tube. The piston 16 is slidable between a lower position, as in FIG. 1, with its lower end 17 below the lower end 20 of the aperture 19 and an upper position, as in FIG. 2, with its lower end 17 substantially above the lower end 20 of the aperture 19.

A weight 22 in, and spaced from, the housing 11, is positioned to exert a downward force on the piston 16 by virtue of the gravitational attraction of the weight 22 to the earth; such that, when fluid 23 is supplied under pressure to the inlet port 12, the fluid 23 presses upward against the lower end 17 of the piston 16, the weight 22 presses downward against the piston 16; and when the lower end 17 of the piston 16 is at a level between the ends 20, 21 of the aperture 19 the fluid 23 flows in from the inlet port 12, through the open portion of the aperture 19, into the other space in the housing 11, and out through the outlet port 13, at a substantially constant predetermined pressure that is directly proportional to the combined mass of the piston 16 and the weight 22.

The weight 22 is typically positioned to press against the upper end 24 of the piston 16, and preferably is affixed to the piston 16 as indicated at 25.

Typically the weight 22 comprises predominantly an annular body surrounding, and coaxial with, upper portions of the piston 16 and the tube 14; and the piston 16 preferably extends down at least to the level of the lower end 26 of the annular body 22 (and typically farther down, as in FIGS. 1 and 2).

The valve 10 typically comprises also a surface 27 in the housing 11 that prevents upward movement of the weight 22 and the piston 16 beyond a predetermined stable upper position (as in FIG. 2), and another surface 28 in the housing 11 that prevents downward movement of the weight 22 and piston 16 beyond a lower position (as in FIG. 1) where the lower end 17 of the piston 16 is at a predetermined level 29 below the lower end 20 of the aperture 19, and where the weight 22 and the piston 16 are away from any contact with the upper end 18 of the tube 14.

The predetermined level 29 below the lower end 20 of the aperture 19 is such that upward movement of the piston 16 from there to the level at which the lower end 17 of the piston 16 is just above the lower end 20 of the aperture 19 is sufficient to be readily detectable by inexpensive sensing means, while small enough to provide response that is fast enough to minimize any momentary deviation from constant pressure in a fluid system controlled by the valve 10. Convenient sensing means typically comprises a magnetic member 31 connected to move with the piston 16, and means 32 for providing a signal responsive to the position of the magnetic member 31. The signal providing means typically comprises a magnetically actuated switch 32.

Depending largely on where the valve 10 is to be mounted, the inlet port 12 may be located on a vertical surface of the housing 11 (as in FIG. 1), or it may comprise an extension of the vertical tube 14 through the bottom of the housing 11 (as in FIG. 2).

The valve 10 is especially advantageous for operation with a liquid. Preferably the liquid 23 substantially fills the housing 11 and thus damps the movement of the moving parts therein. The liquid typically consists essentially of oil.

An analysis of the valve shows that a slight increase in pressure at the valve inlet will occur as the valve opens, due to frictional pressure drop in the tube with increased flow. This effect can be minimized by making the inlet tube as short as possible and shaping it so as to minimize unnecessary pressure drop. If a long tube is required it can be of large diameter, changing to a small diameter near the valve inlet. Because a large piston requires a large weight, the tube should be as small as possible consistent with the permissible pressure error for the oil system.

A dynamic force analysis on the piston and weight indicates that the valve might be unstable. An increase in pressure below the piston causes the piston to rise, imparting an upward momentum that may cause the piston to overtravel and allow too much oil to flow through the slot. Allowing too much oil flow causes the pressure to fall, and the piston moves back down the tube, possibly closing off too much of the slot. Thus, the valve can bounce or hunt.

An advantage of the present invention is that a relatively large motion of the piston is required for a small change in the open area of the slot, so valve motion is damped by the friction of the piston on the tube and by the flow of oil around the weight, which should be submerged in the oil. Unlike most valves disclosed in the literature, this valve does not need a separate damper, and a close tolerance fit between the piston and the tube is not required.

The valve is optimally arranged to provide a dead zone below the slot as shown. This allows particles which are swept along by high oil velocities to settle out and be trapped in the bottom of the valve, since velocities outside the slot may be relatively low and particles may be trapped by the impact of the slot jet against the side of the valve.

If the slot is located too near the bottom of the valve, particles might remain entrained with the oil.

The valve is useful in any oil system requiring controlled pressure over a wide variation in oil flow conditions and where it can be maintained in an upright position. It is especially advantageous in hot oil commercial cooking systems since it is more reliable and less expensive than spring relief or active control relief valves.

Circulating oil systems, particularly those which supply oil to intermittent use devices require a means of regulating oil pressure supply to the devices. This is particularly true when several intermittent devices are operated in parallel. The valve of this invention can regulate the supply pressure over a very large range of flow rates, and can serve as both a pressure control device and as a reservoir for oil storage.

APPLICABILITY

Figure 4:
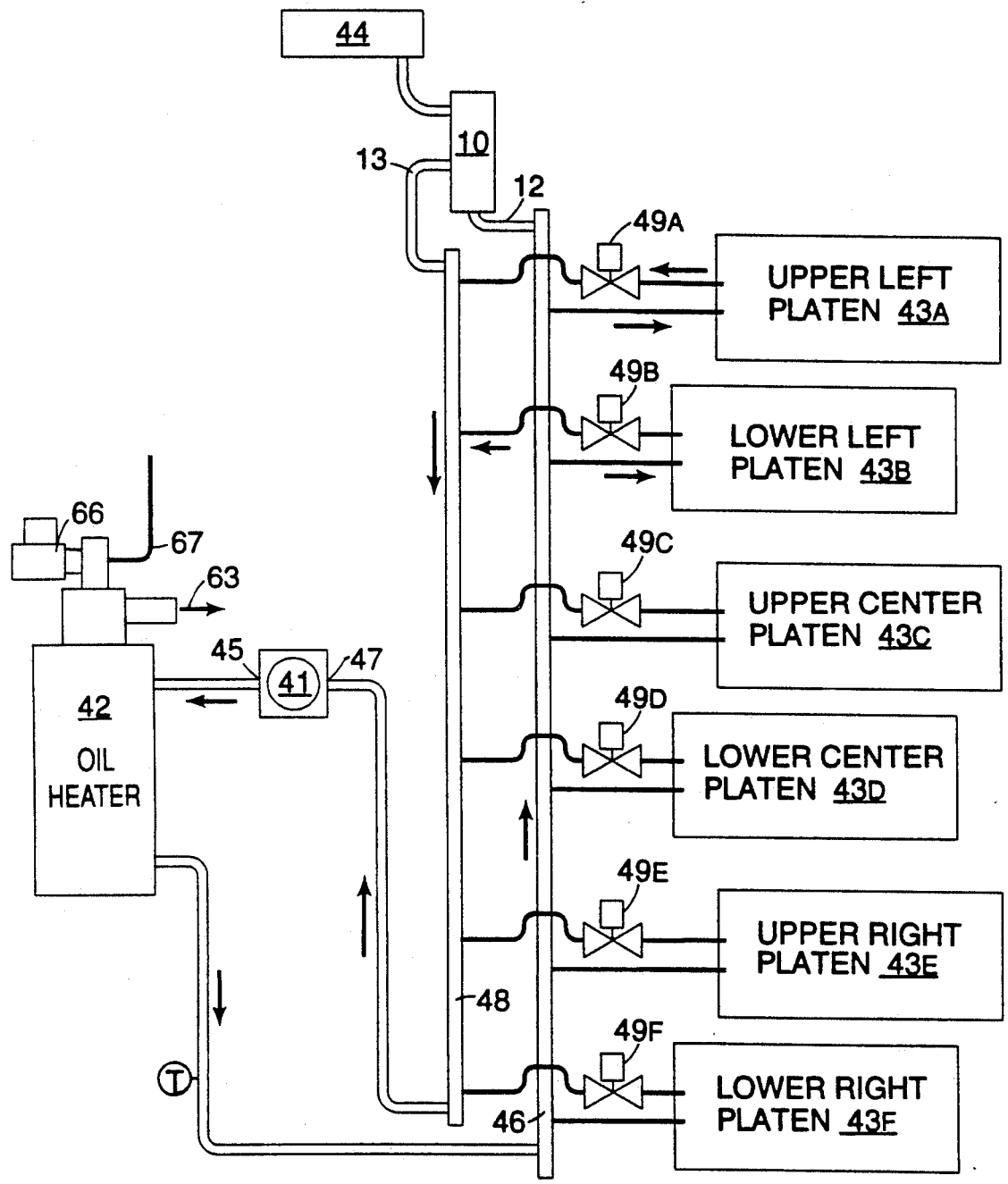
FIG. 4 is a schematic diagram showing a typical gas-fired double-sided griddle for high-volume commercial cooking in which the valve in FIGS. 1-3 is especially useful.

The valve may be employed in a manner as shown in FIG. 4, which is a schematic diagram of a hot oil system 40. In a conventional manner, a forced draft fan 66 provides fuel from a gas supply line 67, mixed with air from the atmosphere, to an oil heater 42. Combustion products are removed through a vent at 63. Discharge from a pump 41 is directed through the oil heater 42 and from there to the base 12 of the valve 10 as well as to the various oil heated devices 43A-43F. Oil from the various devices returns to the pump suction 47, as does the outlet 13 from the valve 10. The upper portion of the valve 10 serves as an expansion reservoir connected with the pump suction 47. Depending on system and valve capacities, a supplemental expansion tank 44 may be desired to accommodate expansion of oil during heating.

When all of the devices 43 are in operation, oil flows primarily to them and the valve 10 typically is positioned near the lower end of the travel, with its exact position determined by the excess capacity of the pump 41. As devices 43 are closed, there is less demand for oil and the flow through the valve 10 increases. Because the pressure at the base of the valve 10 is controlled by the weight 22 on the piston 16, the effect is for the slot 19 to open further, not for the pressure to increase. This insures that there is no surge of oil to any active devices and that oil flow through any one device is independent of the oil flow in the other devices, so long as line pressure losses are negligible.

The valve 10 provides the following advantages over a conventional relief valve for hot oil applications.
  a. Minimal variation of pressure with valve position. Because conventional relief valves compress a spring to relieve, the pressure at the valve inlet is a significant function of flow through the valve.
  b. Simple construction with virtually no limitation on materials. No special spring steels are required. Because oil flows through the valve continuously, no special machined clearances are required. No seats are required.
  c. The valve is easily stabilized. This is particularly important when multiple devices may suddenly stop flow simultaneously. Most other designs making use of the dead weight principal are subject to instability, as are spring loaded valves. Such devices require external means of stabilization when used in systems involving rapid changes in flow or pressure.
  d. The valve is integral to the oil reservoir. This reduces manufacturing costs, occupied volume, and surface area for heat loss.

The present valve is ideal for small oil systems such as those used for cooking appliances. The low cost, low occupied volume, low surface area features are particularly important for compact, high efficiency appliances.

The valve can maintain approximately constant pressure drop over a wide range of flows. This is different from other somewhat similar devices, which provide nearly constant pressure over only a small range of flow rates, such as the Fluid Pressure Regulating Device of Donald C. Murray, U.S. Pat. No. 2,739,607, issued Mar. 27, 1956.

The valve is especially beneficial for systems that must maintain an approximately constant flow of oil from a single supply source regardless of the number of oil-using devices that are turned on. In the system shown in FIG. 4, oil must flow through the pump 41 and heat exchanger 42 at a rate that prevents high pressures at the pump discharge 45 and insures that fluid is not overheated in the heat exchanger 42.

When all loads 43 are shut off, the valve 10 opens to bypass flow. As each device 43 is turned on, the valve 10 moves slightly closed in response to lower flow through it, and on the attendant drop in pressure through the valve 10. Because the valve 10 acts to maintain pressure below the piston 16, the pressure in the supply manifold 46 is nearly constant regardless of the number of devices 43 that are on. Further, because the manifold pressure is approximately constant, each oil-using device 43 receives its proper flow regardless of the number of other devices 43 in service.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. In parallel with a plurality of devices through which fluid can flow, and in circuit with a source of fluid under pressure, the fluid source having a high pressure side and a suction side; a pressure and flow regulating valve, positioned in a predetermined fixed attitude, comprising a housing having an inlet port communicating with the high pressure side of the fluid source and an outlet port communicating with the suction side of the fluid source;

a straight elongate tube affixed to the housing, positioned vertically therein, and having an opening at its lower end communicating with the inlet port;

a piston having a solid horizontal lower end extending down into the tube from the open upper end of the tube, and slidably fitting therein;

a substantially lengthwise aperture in the tube, extending upward from a level near the lower end of the tube to a level substantially below the upper end of the tube;

the piston being slidable between a lower position with its lower end below the lower end of the aperture and an upper position with its lower end substantially above the lower end of the aperture; and a weight in, and spaced from, the housing, and positioned to exert a downward force on the piston by virtue of the gravitational attraction of the weight to the earth;

such that the fluid supplied under pressure by the fluid source to the inlet port presses upward against the lower end of the piston, the weight presses downward against the piston; and when the lower end of the piston is at a level between the ends of the aperture the fluid flows in from the inlet port, through the open portion of the aperture, into the other space in the housing, and out through the outlet port to the suction side of the fluid source, at a substantially constant predetermined pressure that is directly proportional to the combined mass of the piston and the weight and substantially independent of the position of the piston in the tube, thereby maintaining the predetermined pressure and total flow rate from the fluid source in the circuit, while retaining all of the fluid therein, regardless of the number of parallel devices permitting fluid to flow through them.

2. A valve as in claim 1, wherein the weight is positioned to press against the upper end of the piston.

3. A valve as in claim 2, wherein the weight is affixed to the piston.

4. A valve as in claim 2, wherein the weight comprises predominantly an annular body surrounding, and coaxial with, upper portions of the piston and the tube.

5. A valve as in claim 4, wherein the piston extends down at least to the level of the lower end of the annular body.

6. A valve as in claim 4, comprising also a surface in the housing that prevents upward movement of the weight and the piston beyond a predetermined stable position.

7. A valve as in claim 4, comprising also a surface in the housing that prevents downward movement of the weight and piston beyond a position where the lower end of the piston is at a predetermined level below the lower end of the aperture, and where the weight and the piston are away from any contact with the upper end of the tube.

8. A valve as in claim 7, wherein the predetermined level below the lower end of the aperture is such that upward movement of the piston from there to the level at which the lower end of the piston is just above the lower end of the aperture is sufficient to be readily detectable by inexpensive sensing means, while small enough to provide response that is fast enough to minimize any momentary deviation from constant pressure in a fluid system controlled by the valve.

9. A valve as in claim 8, comprising also a magnetic member connected to move with the piston, and means for providing a signal responsive to the position of the magnetic member.

10. A valve as in claim 9, wherein the signal providing means comprises a magnetically actuated switch.

11. A valve as in claim 1, wherein the inlet port comprises an extension of the vertical tube through the bottom of the housing.

12. A valve as in claim 1, for operation with a liquid, wherein the liquid substantially fills the housing and thus damps the movement of the moving parts therein.

13. A valve as in claim 12, wherein the liquid consists essentially of oil.

14. A pressure regulating valve, adapted for mounting and operation in a predetermined fixed attitude, comprising
a housing having an inlet port and an outlet port;
a straight elongate tube so affixed to the housing as to be positioned vertically when the valve is mounted in the fixed attitude for operation, and having an opening at its lower end communicating with the inlet port;
a piston having a solid horizontal lower end extending down into the tube from the open upper end of the tube, and slidably fitting therein;
a substantially lengthwise aperture in the tube, extending upward from a level near the lower end of the tube to a level substantially below the upper end of the tube;
the piston being slidable between a lower position with its lower end below the lower end of the aperture and an upper position with its lower end substantially above the lower end of the aperture; and
a weight in, and spaced from, the housing, and positioned to press against the upper end of the piston and to exert a downward force on the piston by virtue of the gravitational attraction of the weight to the earth;
the weight comprising predominantly an annular body surrounding, and coaxial with, upper portions of the piston and the tube;
a surface in the housing that prevents downward movement of the weight and piston beyond a position where the lower end of the piston is at a predetermined level below the lower end of the aperture, and where the weight and the piston are away from any contact with the upper end of the tube;
such that, when fluid is supplied under pressure to the inlet port, the fluid presses upward against the lower end of the piston, the weight presses downward against the piston; and when the lower end of the piston is at a level between the ends of the aperture the fluid flows in from the inlet port, through the open portion of the aperture, into the other space in the housing, and out through the outlet port, at a substantially constant predetermined pressure that is directly proportional to the combined mass of the piston and the weight.

15. A valve as in claim 14, wherein the predetermined level below the lower end of the aperture is such that upward movement of the piston from there to the level at which the lower end of the piston is just above the lower end of the aperture is sufficient to be readily detectable by inexpensive sensing means, while small enough to provide response that is fast enough to minimize any momentary deviation from constant pressure in a fluid system controlled by the valve.

16. A valve as in claim 15, comprising also a magnetic member connected to move with the piston, and means for providing a signal responsive to the position of the magnetic member.

17. A valve as in claim 16, wherein the signal providing means comprises a magnetically actuated switch.

* * * * *